United States Patent
Chien

(10) Patent No.: US 8,954,623 B2
(45) Date of Patent: Feb. 10, 2015

(54) UNIVERSAL SERIAL BUS DEVICES SUPPORTING SUPER SPEED AND NON-SUPER SPEED CONNECTIONS FOR COMMUNICATION WITH A HOST DEVICE AND METHODS USING THE SAME

(71) Applicant: MediaTek Inc., Hsin-Chu (TW)

(72) Inventor: Yi-Wen Chien, Guishan Township, Taoyuan County (TW)

(73) Assignee: MediaTek Inc., Hsin-Chu (TW)

( * ) Notice: Subject to any disclaimer, the term of this patent is extended or adjusted under 35 U.S.C. 154(b) by 0 days.

(21) Appl. No.: 13/868,367

(22) Filed: Apr. 23, 2013

(65) Prior Publication Data

US 2014/0317320 A1     Oct. 23, 2014

(51) Int. Cl.
    *G06F 3/00*     (2006.01)
    *G06F 13/38*     (2006.01)

(52) U.S. Cl.
    CPC .................................. *G06F 13/385* (2013.01)
    USPC ........................................................... 710/14

(58) Field of Classification Search
None
See application file for complete search history.

(56) References Cited

U.S. PATENT DOCUMENTS

| | | | |
|---|---|---|---|
| 7,124,233 B2 | 10/2006 | Tang | |
| 7,478,191 B2 * | 1/2009 | Wurzburg et al. | 710/316 |
| 2005/0235091 A1 * | 10/2005 | Chen et al. | 710/313 |
| 2007/0245058 A1 * | 10/2007 | Wurzburg et al. | 710/313 |
| 2008/0195770 A1 * | 8/2008 | Wang et al. | 710/18 |
| 2009/0106474 A1 * | 4/2009 | Bohm et al. | 710/309 |
| 2013/0185462 A1 * | 7/2013 | Manabe | 710/16 |

FOREIGN PATENT DOCUMENTS

TW     M439276     10/2012

OTHER PUBLICATIONS

English language translation of abstract of TW M439276 (published Oct. 11, 2012).

* cited by examiner

*Primary Examiner* — Elias Mamo
(74) *Attorney, Agent, or Firm* — McClure, Qualey & Rodack, LLP

(57) ABSTRACT

Universal Serial Bus (USB) devices supporting super speed and non-super speed connections for communication with a host device includes a plurality of endpoints (EPs), a non-super speed connection port, a super speed connection port and a configuration unit. The non-super speed connection port and the super speed connection port are connected to the host device. The configuration unit is arranged for dividing the EPs to first and second groups of EPs according to a bandwidth requirement, determining whether a super speed connection with the host device is successfully established and configuring the first group of EPs to operate at a super speed and configuring the second group of EPs to operate at a non-super speed when the super speed connection with the host device is successfully established such that the USB device communicates with the host device at both the super speed and the non-super speed.

17 Claims, 4 Drawing Sheets

UNIVERSAL SERIAL BUS DEVICES SUPPORTING SUPER SPEED AND NON-SUPER SPEED CONNECTIONS FOR COMMUNICATION WITH A HOST DEVICE AND METHODS USING THE SAME

BACKGROUND OF THE INVENTION

1. Field of the Invention

The disclosure relates generally to Universal Serial Bus (USB) devices, and, more particularly to USB devices supporting super speed and non-super speed connections for communication with a host device and related methods.

2. Description of the Related Art

With vigorous development of computers and communications industry, a special interface system standard called "Universal Serial Bus" (USB) is established for communication connection. USB is a serial bus standard for external apparatus connection, providing hot plug, plug and play and other related functions. Currently, the USB 2.0 standard provides three transfer rates: low-speed (LS), full-speed (FS), and high-speed (HS) transfer rates, which support: 1.5 Mbps; 12 Mbps; and 480 Mbps data rates, respectively. However, due to continued advanced technological development, the electronic apparatuses may require to quickly access data from external apparatuses and subsequently perform related operations.

Therefore, a next generation USB industry-standard, the USB 3.0 standard, was established by the USB Implementers Forum. The USB 3.0 standard allows employment of Super Speed (SS) data transfer and non-Super Speed (i.e. USB 2.0) data transfer simultaneously, wherein Super Speed data transfer supports up to a 5 Gbps data rate. A USB system may include a USB host device and a USB device. The USB host device therein is responsible for controlling the timing and direction of data transmission on the USB. The USB device serves as the peripheral of the USB system.

A USB device may try to establish link on Super Speed (SS) with the host device first and then switch to establish a non-Super Speed such as the HS/FS/LS link if the SS link can not be established. Generally speaking, SS link and HS link cannot be active concurrently for one USB device. In other words, only one of the SS or HS/FS/LS links can be active at one time for one USB device. To active SS link and HS link concurrently, a physically or logically hub device that supports both SS link and HS link must be provided. Implementation of the hub device, however, can increase the hardware cost and design complexity for the USB system.

BRIEF SUMMARY OF THE INVENTION

Universal Serial Bus (USB) device supporting super speed and non-super speed connections for communication with a host device and related methods are provided.

An embodiment of a USB device supporting super speed and non-super speed connections for communication with a host device includes a plurality of endpoints (EPs), a non-super speed connection port, a super speed connection port and a configuration unit. The non-super speed connection port and the super speed connection port are connected to the host device. The configuration unit is arranged for dividing the EPs to first and second groups of EPs according to a bandwidth requirement, determining whether a super speed connection with the host device is successfully established and configuring the first group of EPs to operate at a super speed and configuring the second group of EPs to operate at a non-super speed when the super speed connection with the host device is successfully established such that the USB device communicates with the host device at both the super speed and the non-super speed.

In another embodiment, a method for supporting super speed and non-super speed connections for a plurality of endpoints (EPs) in a USB device connected to a host device is provided. The method comprises the steps of dividing the EPs to first and second groups of EPs according to a bandwidth requirement of each EP, determining whether a super speed connection with the host device is successfully established, and configuring the first group of the EPs to operate at a super speed and configuring the second group of the EPs to operate at a non-super speed when the super speed connection with the host device is successfully established, such that the USB device is configured to communicate with the host device at both the super speed and the non-super speed via the super speed connection and the non-super speed connection.

Methods for supporting super speed and non-super speed connections for a plurality of EPs in a USB device may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
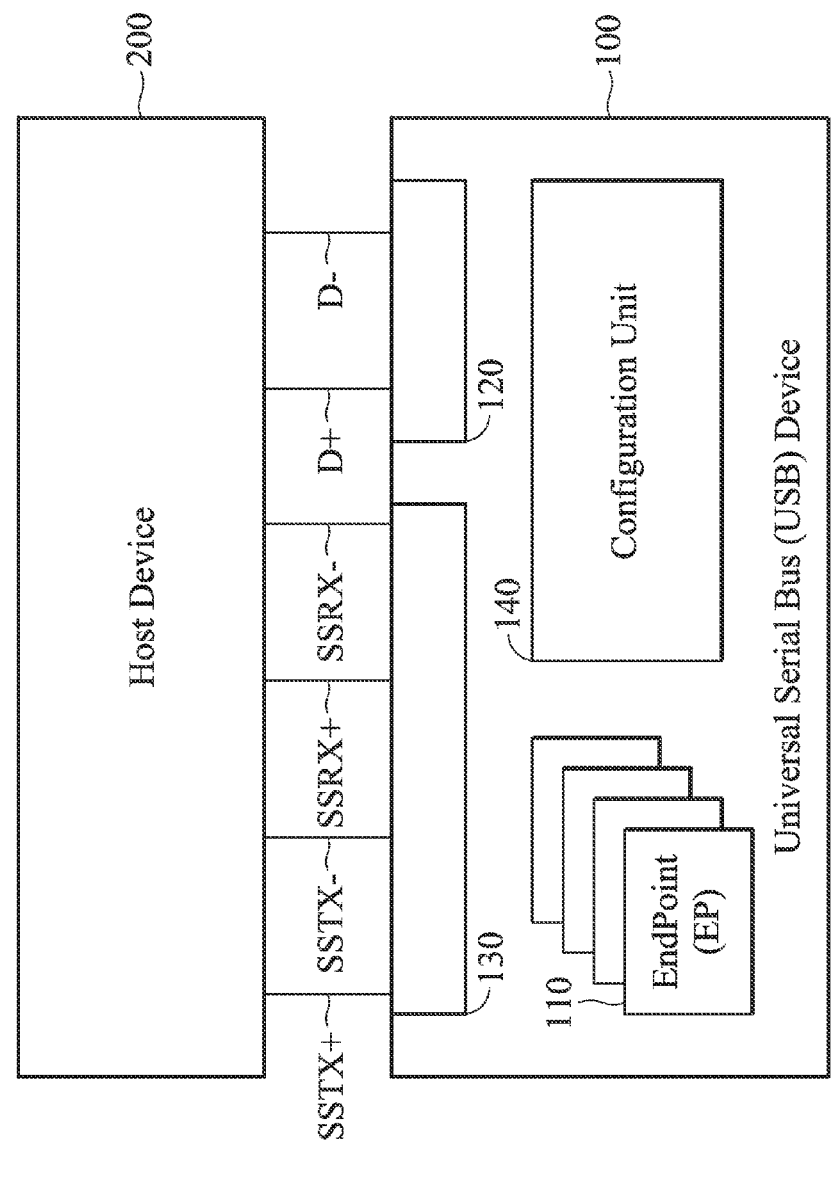
FIG. 1 is a schematic diagram illustrating an embodiment of a USB system of the invention.

FIG. 1 is a schematic diagram illustrating an embodiment of an USB system of the invention. The USB system 10 of the invention at least comprises a USB device 100 and a host device 200. For example, the USB device 100 may be a portable USB device and the host device 200 may be a computer system, but it is not limited thereto. The USB device 100 may communicate with the host device 200 through a super speed connection or non-super speed connection. It is understood that, the non-super speed may comprise at least one of USB low-speed (LS), high-speed (HS) and full-speed (FS).

The USB device 100 may support both the super speed and non-super speed connections for communication with the host device 200. It is noted that, the USB device 100 is directly connected to the host device 200 without any hub device configured therebetween. The USB device 100 at least includes a plurality of endpoints (EPs) 110, a non-super speed connection port 120, a super speed connection port 130 and a configuration unit 140. The non-super speed connection port 120 and the super speed connection port 130 are connected to responsive ports of the host device 200.

The USB device 100 may receive/transmit a pair of differential signals D+/D− that conform to the USB 2.0 standard from/to the host device 200 via the non-super speed connection port (e.g. a USB 2.0 port) 120, wherein the non-super speed connection port 120 includes pins D+ and D− for receiving/transmitting a pair of differential signals D+/D− that conform to the USB 2.0 standard. In order to simplify the description, the ground and power wires of the non-super speed connection port 120 are not described further. Similarly, the USB device 100 may receive/transmit the differential signals that conform to a super speed standard from/to the host device 200 via the super speed connection port 130, wherein the super speed connection port 130 includes pins SSTX+, SSTX−, SSRX+ and SSRX− for receiving/transmitting differential signals include a pair of transmitter differential signals SSTX+/SSTX− and a pair of receiver differential signals SSRX+/SSRX−, respectively. The USB device 100 may communicate with the host device 200 at a super speed via the super speed connection port 130 and may communicate with the host device 200 at a non-speed (e.g. a HS) via the non-super speed connection port 120. The USB device 100 may be capable of operating at the super speed and the non-super speed, such as high speed or full speed simultaneously. For example, the USB device 100 may be coupled to the super speed connection port of the host device 200 through the super speed connection port 130 for interacting with the host device 200 at the super speed. Similarly, the USB device 100 may be coupled to a non-super speed connection port of the host device 200 through the non-super speed connection port 120 for interacting with the host device 200 at the non-super speed. The USB device 100 may comprise a plurality of endpoints (EPs) 110, which are used to implement device functions, and each endpoint is assigned with a one-and-only number called "endpoint number". In some embodiments, the USB device 100 may consist of a USB 3.0 device providing a first group of EPs and a USB 2.0 device providing a second group of EPs. In some embodiments, the USB device 100 may consist of a first functional block providing a first group of EPs and a second functional block providing a second group of EPs.

The configuration unit 140 can perform the method for supporting super speed and non-super speed connections for a plurality of USB EPs of the present invention, which will be discussed further in the following paragraphs. It is noted that, the configuration unit 140 can be arranged for dividing the EPs to first and second groups of EPs according to a bandwidth requirement. In some embodiments, each EP may have a bandwidth requirement, either a low bandwidth requirement or a high bandwidth requirement, and the configuration unit 140 may divide the EPs to first and second groups of EPs by configuring the EPs with the high bandwidth requirement to be the first group of EPs and configuring the EPs with the low bandwidth requirement to be the second group of EPs. In some embodiments, there may be some EPs that are limited for operating at the non-super speed (e.g. a HS, FS or LS) and the configuration unit 140 may further configure the EPs that are limited for operating at the non-super speed to be the second group of EPs.

Figure 2:
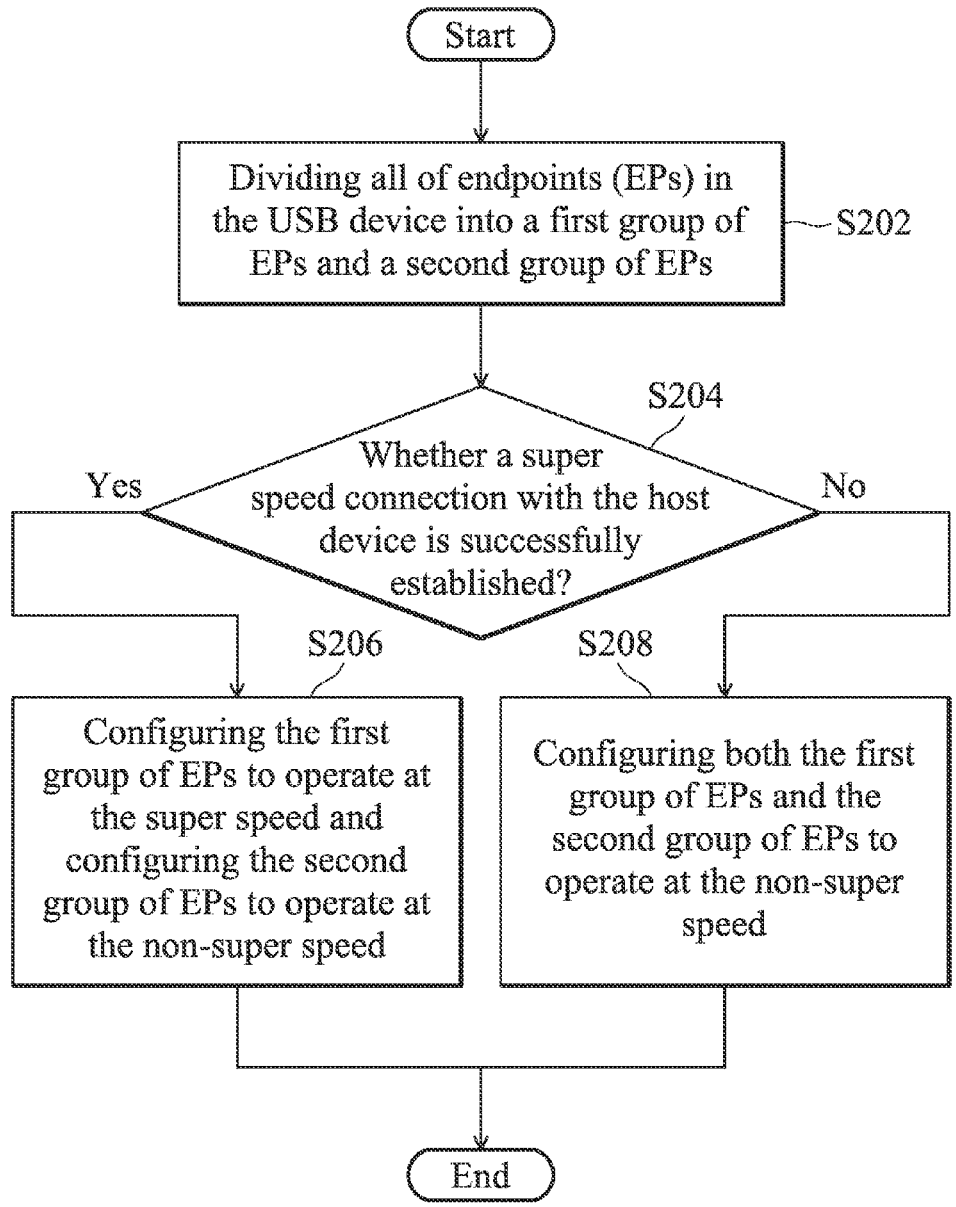
FIG. 2 is a flowchart of an embodiment of a method for supporting super speed and non-super speed connections for a plurality of USB endpoints of the invention.

FIG. 2 is a flowchart of an embodiment of a method for supporting super speed and non-super speed connections for a plurality of USB EPs of the invention. Please refer to FIGS. 1 and 2. The method can be applied to the USB device 100 as shown in FIG. 1, such as a USB composite device comprising both a USB 3.0 device and a USB 2.0 device or a single device comprising a first functional block containing functions that are required to be operated at the super speed and a second functional block containing functions that can be operated at the non-super speed. However, it is to be understood that the invention is not limited thereto. In this embodiment, the USB device 100 is connected to the host device 200 through the non-super speed connection port 120 and the super speed connection port 130 simultaneously so that the USB device 100 may attempt to establish a super speed communication link and/or a non-super speed communication link with the host device 200 to communicate with it. It is noted that, the USB device 100 is directly connected to the host device 200 without any hub device configured therebetween.

First, in step S202, the configuration unit 140 divides all of EPs 110 in the USB device into a first group of EPs GA and a second group of EPs GB. In some embodiments, each EP may have a bandwidth requirement, either a low bandwidth requirement or a high bandwidth requirement, and the configuration unit 140 may divide the EPs to first and second groups of EPs by configuring the EPs with the high bandwidth requirement to be the first group of EPs GA and configuring the EPs with the low bandwidth requirement to be the second group of EPs GB. In some embodiments, there may be some EPs that are limited, by software or hardware component, for operating at the non-super speed (e.g. a HS, FS or LS) and the configuration unit 140 may further configure the EPs that are limited for operating at the non-super speed to be the second group of EPs GB.

After the first group of EPs GA and the second group of EPs GB have been determined, in step S204, the configuration unit 140 then determines whether a super speed connection with the host device 200 is successfully established. In this step, the configuration unit 140 first tries to establish a super speed connection with the host device 200 through the super speed connection port 130 such that the host device 200 may detect that a USB 3.0 device has been connected. The host device 200 may establish a super speed connection with the USB device 100 if it supports the super speed data transmission and the super speed connection between the host device 200 and the USB device 100 can be successfully established. Contrarily, the host device 200 may establish a non-super speed connection (e.g. a high-speed connection) with the USB device 100 if it does not support the super speed data transmission and the super speed connection between the host device 200 and the USB device 100 is not successfully established. The configuration unit 140 may then configure the first group of EPs GA to be operated at the super speed or the non-super speed according to the determination result in step S204.

If the super speed connection with the host device 200 is successfully established (Yes in step S204), which means that the host device 200 supports the super speed data transmission, in step S206, the configuration unit 140 configures the first group of EPs GA to operate at the super speed and configures the second group of EPs GB to operate at the non-super speed. The procedure ends. In this case, because the USB device 100 has established a super speed connection and a non-super speed connection with the host device 200 at the same time so that the USB device 100 can communicate with the host device 200 at both the super speed and the non-super speed. For example, the USB device 100 can communicate with the host device 200 at the super speed and the high speed.

If the super speed connection with the host device 200 is not successfully established (No in step S204), which means that the host device 200 does not support the super speed data transmission, in step S208, the configuration unit 140 configures both the first group of EPs GA and the second group of EPs GB to operate at the non- super speed and the procedure ends. In this step, the USB device 100 may establish a non-super speed connection (e.g. a FS/HS/LS connection) with the host device 200. Because the USB device 100 has only established a non-super speed connection with the host device 200, the USB device 100 can communicate with the host device 200 at the non-super speed. For example, the USB device 100 can communicate with the host device 200 at the full speed.

Figure 3A:
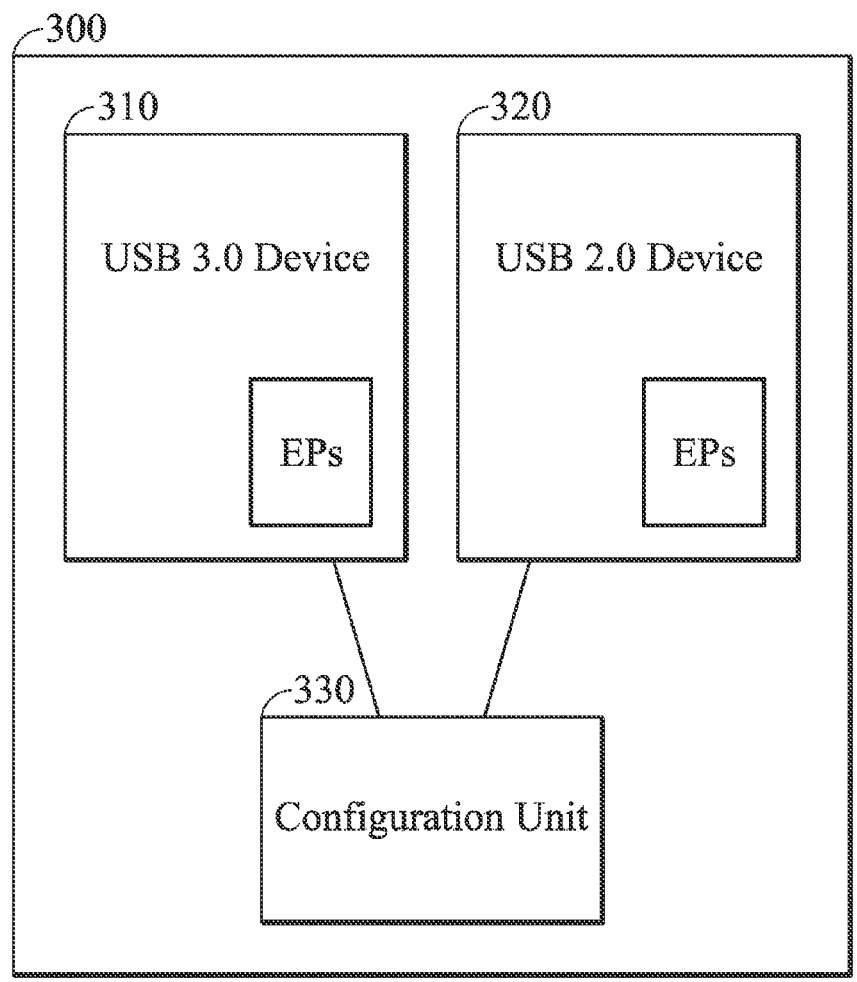
FIGS. 3A and 3B are schematic diagrams illustrating embodiments of the USB devices of the invention.

In some embodiments, the USB device 100 may consist of a USB 3.0 device providing a group of EPs and a USB 2.0 device providing another group of EPs and the configuration unit of the USB device may further determine whether the EPs belong to the USB 3.0 device or the USB 2.0 device. FIG. 3A is a schematic diagram illustrating an embodiment of a USB device of the invention. As shown in FIG. 3A, the USB device 300 consists of a USB 3.0 device 310, a USB 2.0 device 320 and a configuration unit 330, wherein the USB 3.0 device 310 provides a group of EPs and the USB 2.0 device 320 provides another group of EPs. The configuration unit 330 may collect the group of EPs from the USB 3.0 device 310 and the group of EPs from the USB 2.0 device 320 and configure the group of EPs belong to the USB 3.0 device to be the first group of EPs GA and configure the group of EPs belong to the USB 2.0 device to be the second group of EPs GB. Then, the configuration unit 330 determines whether a super speed connection with the host device 200 is successfully established. The configuration unit 330 tries to establish a super speed connection with the host device 200 through the super speed connection port such that the host device 200 may detect that a USB 3.0 device has been connected. In this embodiment, it is assumed that the host device 200 supports the super speed data transmission so that the super speed connection with the host device 200 is successfully established. Therefore, the configuration unit 330 may then configure the first group of EPs GA to operate at the super speed and configures the second group of EPs GB to operate at the non-super speed. The USB device 100 can communicate with the host device 200 at both the super speed and the non-super speed.

Figure 3B:
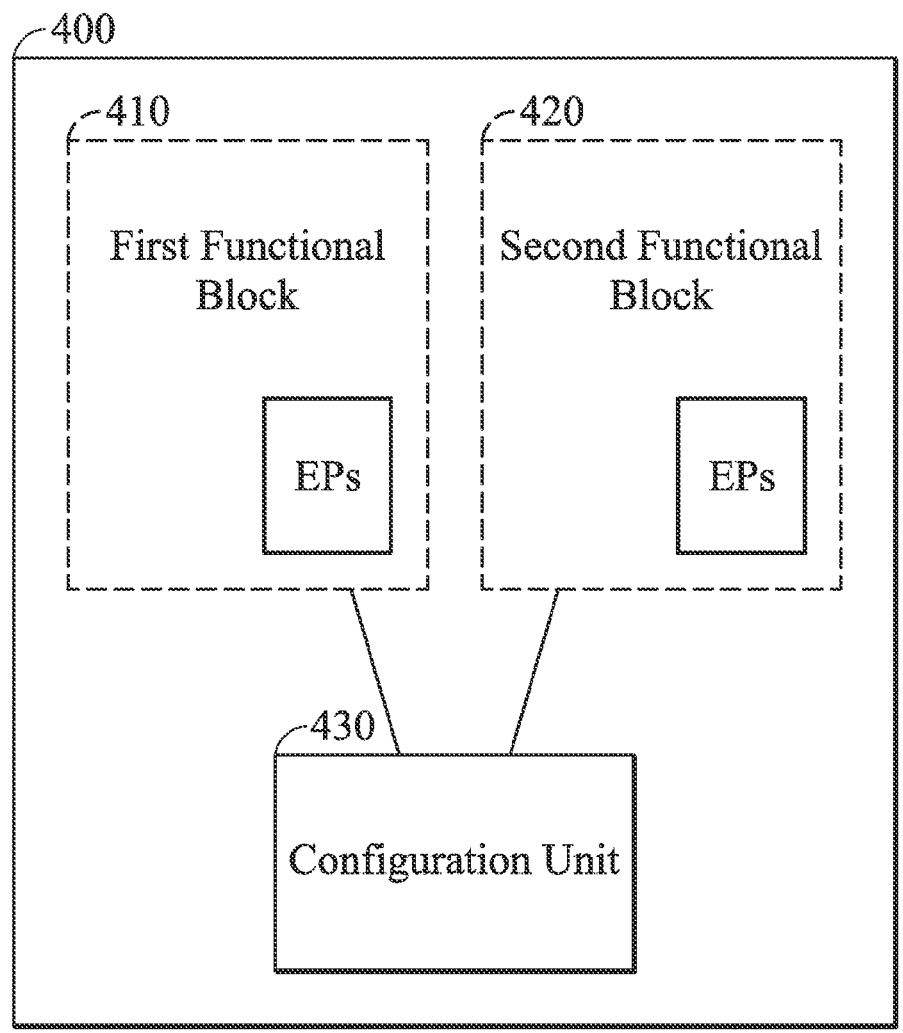

In some embodiments, the USB device 100 may be a single device consisting of a first functional block providing a group of EPs which can be operated at the super speed and a second functional block providing another group of EPs which can be operated at the non-super speed, the configuration unit of the USB device may further determine the EPs belong to which functional block. FIG. 3B is a schematic diagram illustrating another embodiment of the USB device of the invention. As shown in FIG. 3B, the USB device 400 consists of a first functional block 410, a second functional block 420 and a configuration unit 430, wherein the first functional block 410 provides a group of EPs which can be operated at the super speed and the second functional block 420 provides another group of EPs which can be operated at the non-super speed. The configuration unit 430 may collect the group of EPs from the first functional block 410 and the group of EPs from the second functional block 420 and configure the group of EPs belong to the first functional block 410 to be first group of EPs GA and configure the group of EPs belong to the second functional block 420 to be second group of EPs GB. It is understood that, a USB device may only has a single device address, e.g. the endpoint zero (EP0) for device identification, because the host device 200 only assigns a device address to a function. In this case, the configuration unit 430 further configures one of the second group of EPs as endpoint zero when the super speed connection with the host device 200 is successfully established to report to the host device 200 that, in addition to a super speed device has connected, there is other non-super speed device has connected at the same time. Similarly, the configuration unit 430 may then determine whether a super speed connection with the host device 200 is successfully established. The configuration unit 430 tries to establish a super speed connection with the host device 200 through the super speed connection port such that the host device 200 may detect that a super speed device has been connected.

If the host device 200 supports the super speed data transmission, the super speed connection with the host device 200 can be successfully established so that the configuration unit 430 may then configure the first group of EPs GA to operate at the super speed and configure the second group of EPs GB to operate at the non-super speed. Therefore, the USB device 400 can communicate with the host device 200 at both the super speed and the non-super speed. If the host device 200 does not support the super speed data transmission, the super speed connection with the host device 200 is not successfully established so that the configuration unit 430 may then configure both the first group of EPs GA and the second group of EPs GB to operate at the non-super speed (e.g. the HS). In some embodiments, if there are some EPs that are limited for operating at the non-super speed (e.g. the FS or LS) and the configuration unit 430 may further configure those EPs that are limited for operating at the non-super speed to be the second group of EPs.

In sum, the USB device and related methods for supporting super speed and non-super speed connections for a plurality of EPs of the invention can support both super speed and non-super speed connections between the host device and the USB device concurrently without implementing any hub device therebetween, thus simplifying the hardware architecture of the USB device. Moreover, the USB device can utilize the idle bandwidth of the non-super speed connection link when the link is established on the super speed connection link such that the USB device can use the bandwidth of both the super speed connection link and the non-super speed connection link, thus increasing the overall performance of one USB device.

Methods for supporting super speed and non-super speed connections for a plurality of EPs in a USB device, or certain aspects or portions thereof, may take the form of a program code (i.e., executable instructions) embodied in tangible media, such as floppy diskettes, CD-ROMS, hard drives, or any other non-transitory machine-readable medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A Universal Serial Bus (USB) device supporting super speed and non-super speed connections for communication with a host device, comprising:

a plurality of endpoints (EPs);

a non-super speed connection port connected to the host device;

a super speed connection port connected to the host device; and a configuration unit, dividing the EPs to first and second groups of EPs according to a bandwidth requirement of each EP, determining whether a super speed connection with the host device is successfully established and configuring the first group of EPs to operate at a super speed and configuring the second group of EPs to operate at a non-super speed when the super speed connection with the host device is successfully established, such that the USB device is configured to communicate with the host device at both the super speed and the non-super speed via the super speed connection and the non-super speed connection respectively.

2. The USB device of claim 1, wherein the configuration unit further configures the first group of EPs and the second group of EPs to operate at the non-super speed when the super speed connection with the host device is not successfully established.

3. The USB device of claim 1, wherein the first group of EPs are EPs with a high bandwidth requirement and the second group of EPs are EPs with a low bandwidth requirement.

4. The USB device of claim 1, wherein the second group of EPs are EPs that are limited for operating at the non-super speed.

5. The USB device of claim 1, wherein the non-super speed comprises USB low-speed (LS), high-speed (HS) and full-speed (FS).

6. The USB device of claim 1, wherein the USB device further comprise a first functional block providing the first group of EPs and a second functional block providing the second group of EPs.

7. The USB device of claim 6, wherein the configuration unit further configures one of the second group of EPs as endpoint zero when the super speed connection with the host device is successfully established.

8. The USB device of claim 1, further comprising a USB 3.0 device providing the first group of EPs and a USB 2.0 device providing the second group of EPs.

9. A method for supporting super speed and non-super speed connections for a plurality of endpoints (EPs) in a USB device connected to a host device, comprising:

dividing the EPs to first and second groups of EPs according to a bandwidth requirement of each EP;

determining whether a super speed connection with the host device is successfully established; and configuring the first group of the EPs to operate at a super speed and configuring the second group of the EPs to operate at a non-super speed when the super speed connection with the host device is successfully established, such that the USB device is configured to communicate with the host device at both the super speed and the non-super speed via the super speed connection and the non-super speed connection.

10. The method of claim 9, further comprising:

configuring the first group of EPs and the second group of EPs to operate at the non-super speed when the super speed connection with the host device is not successfully established.

11. The method of claim 9, wherein the step of dividing the EPs to first and second groups of EPs according to the bandwidth requirement further comprises:

dividing the EPs to a group of EPs with a high bandwidth requirement and a group of EPs with a low bandwidth requirement; and configuring the group of EPs with the high bandwidth requirement to be the first group of EPs and the group of EPs with the low bandwidth requirement to be the second group of EPs.

12. The method of claim 9, wherein the step of dividing the EPs to first and second groups of EPs according to the bandwidth requirement of each EP further comprises:

configuring the EPs that are limited for operating at the non-super speed to be the second group of EPs.

13. The method of claim 9, wherein the non-super speed comprises USB low-speed (LS), high-speed (HS) and full-speed (FS).

14. The method of claim 9, wherein the first group of EPs are provided by a first functional block and the second group of EPs are provided by a second functional block.

15. The method of claim 9, wherein the USB device further comprises a USB 3.0 device and a USB 2.0 device and the first group of EPs is provided by the USB 3.0 device and the second group of EPs is provided by the USB 2.0 device.

16. A non-transitory machine-readable medium comprising a computer program, which, when executed, causes a device to perform a method for method for supporting super speed and non-super speed connections for a plurality of endpoints (EPs) of a Universal Serial Bus (USB) device, wherein the method comprises:

dividing the EPs to first and second groups of EPs according to a bandwidth requirement of each EP;

determining whether a super speed connection with a host device is successfully established; and configuring the first group of the EPs to operate at a super speed and configuring the second group of the EPs to operate at a non-super speed when the super speed connection with the host device is successfully established, such that the USB device is configured to communicate with the host device at both the super speed and the non-super speed via the super speed connection and the non-super speed connection.

17. The non-transitory machine-readable medium of claim 16, wherein the method further comprises:

configuring the first group of EPs and the second group of EPs to operate at the non-super speed when the super speed connection with the host device is not successfully established.

* * * * *